United States Patent
Lee et al.

(10) Patent No.: US 10,097,352 B2
(45) Date of Patent: Oct. 9, 2018

(54) ELECTRONIC DEVICE AND COMMUNICATION METHOD THEREOF

(71) Applicant: Samsung Electronics Co., Ltd., Gyeonggi-do (KR)

(72) Inventors: Kyunghee Lee, Gyeonggi-do (KR); Tymur Korkishko, Gyeonggi-do (KR); Jeongho Park, Seoul (KR); Ignat Korchagin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 177 days.

(21) Appl. No.: 15/068,758

(22) Filed: Mar. 14, 2016

(65) Prior Publication Data
US 2016/0277369 A1 Sep. 22, 2016

(30) Foreign Application Priority Data
Mar. 16, 2015 (KR) .................. 10-2015-0036133

(51) Int. Cl.
*H04L 9/30* (2006.01)
*H04L 29/06* (2006.01)
*H04L 9/08* (2006.01)
*H04L 9/32* (2006.01)
*H04W 76/10* (2018.01)

(52) U.S. Cl.
CPC .............. *H04L 9/30* (2013.01); *H04L 9/0861* (2013.01); *H04L 9/0891* (2013.01); *H04L 9/3242* (2013.01); *H04L 63/0428* (2013.01); *H04L 63/061* (2013.01); *H04L 63/126* (2013.01); *H04W 76/10* (2018.02)

(58) Field of Classification Search
USPC ........................................... 713/168
See application file for complete search history.

(56) References Cited

U.S. PATENT DOCUMENTS

| | | | | |
|---|---|---|---|---|
| 5,465,300 A | * | 11/1995 | Altschuler | H04L 63/0428 380/262 |
| 7,596,224 B2 | * | 9/2009 | Klug | H04K 1/00 380/270 |
| 8,875,262 B2 | * | 10/2014 | Lee | G06F 21/606 726/6 |
| 9,722,775 B2 | * | 8/2017 | Hjelm | H04L 9/006 |

(Continued)

FOREIGN PATENT DOCUMENTS

KR 10-2011-0083937 A 7/2011

OTHER PUBLICATIONS

Diffie-Hellman Key Change, Wikipedia, pp. 1-12, Last Modified Feb. 28, 2016 https://en.wikipedia.org/w/index.php?title=Diffie-Hellman_key_exchange&oldid=707320318.

*Primary Examiner* — David Pearson
*Assistant Examiner* — Badri Champakesan
(74) *Attorney, Agent, or Firm* — Cha & Reiter, LLC.

(57) ABSTRACT

A method and an electronic device are disclosed herein. The electronic device includes a communication unit, a storage unit and at least one processor, which executes the method, including detecting a request for establishing a call session, generating a new security key from a preset security key, renewing the preset security key by setting the generated new security key as a current preset security key, and establishing the call session based on the generated new security key.

17 Claims, 10 Drawing Sheets

(56) References Cited

U.S. PATENT DOCUMENTS

| | | | | |
|---|---|---|---|---|
| 2005/0228997 | A1* | 10/2005 | Bicker | H04L 63/062 |
| | | | | 713/171 |
| 2006/0101266 | A1* | 5/2006 | Klassen | G06Q 20/347 |
| | | | | 713/170 |
| 2008/0144824 | A1* | 6/2008 | Stewart | H04K 1/00 |
| | | | | 380/257 |
| 2010/0064138 | A1* | 3/2010 | Hwang | H04L 63/18 |
| | | | | 713/168 |
| 2011/0179473 | A1* | 7/2011 | Lee | G06F 21/606 |
| | | | | 726/6 |
| 2011/0302408 | A1* | 12/2011 | McDermott | H04L 63/0464 |
| | | | | 713/153 |
| 2012/0002816 | A1* | 1/2012 | Tian | H04L 9/0822 |
| | | | | 380/270 |
| 2012/0170743 | A1* | 7/2012 | Senese | H04L 63/061 |
| | | | | 380/259 |
| 2012/0254615 | A1* | 10/2012 | Ma | H04L 63/164 |
| | | | | 713/171 |
| 2013/0007872 | A1* | 1/2013 | Hariharan | H04H 60/48 |
| | | | | 726/17 |
| 2013/0138961 | A1* | 5/2013 | Tsuji | H04L 9/0656 |
| | | | | 713/171 |
| 2014/0129831 | A1* | 5/2014 | Odinak | H04L 9/0861 |
| | | | | 713/165 |
| 2014/0237570 | A1* | 8/2014 | Shishkov | G06F 21/316 |
| | | | | 726/7 |
| 2016/0117542 | A1* | 4/2016 | Klappert | G06K 9/00013 |
| | | | | 725/25 |
| 2016/0174110 | A1* | 6/2016 | Sharma | H04W 36/0022 |
| | | | | 370/331 |
| 2017/0230335 | A1* | 8/2017 | Walker | H04L 63/0272 |

* cited by examiner

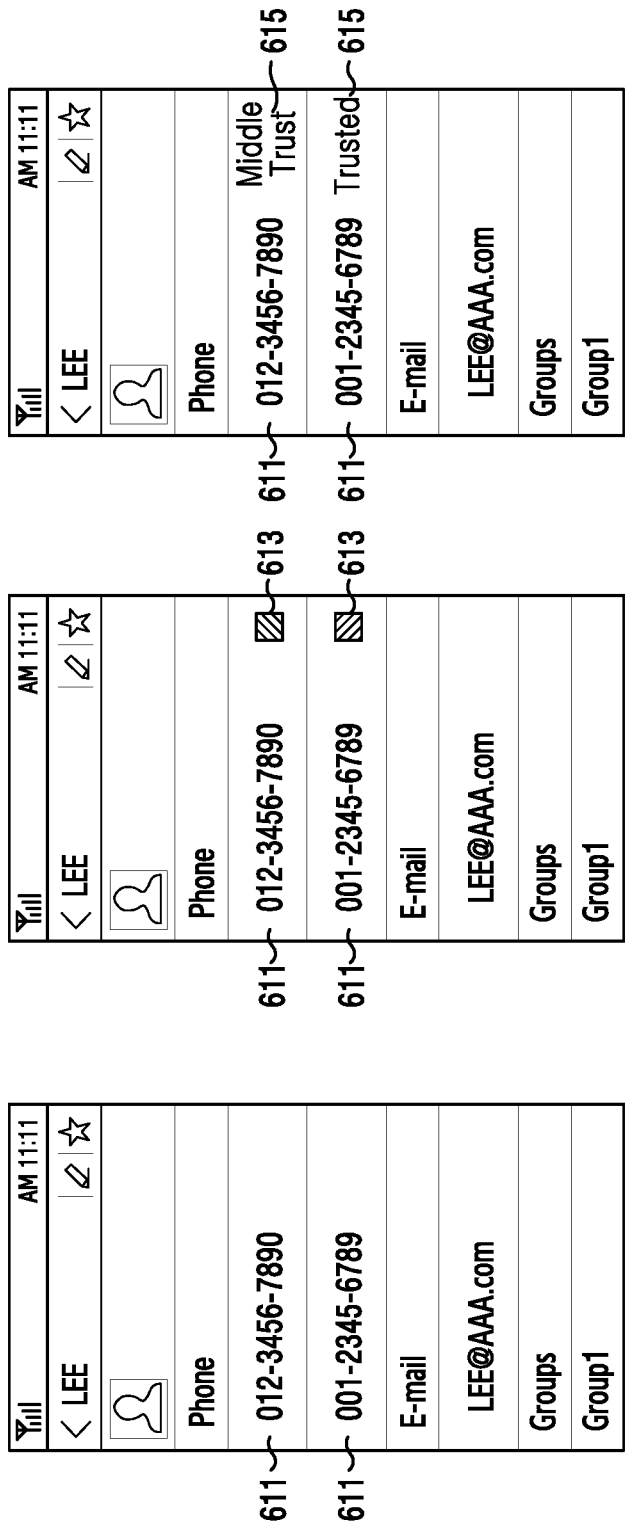

ELECTRONIC DEVICE AND COMMUNICATION METHOD THEREOF

CLAIM OF PRIORITY

This application claims priority under 35 U.S.C. § 119(a) to Korean Application Serial No. 10-2015-0036133, which was filed in the Korean Intellectual Property Office on Mar. 16, 2015, the entire content of which is hereby incorporated by reference.

TECHNICAL FIELD

The present disclosure relates to an electronic device and an operation method thereof, and more particularly to an electronic device for communication protection and a communication method thereof.

BACKGROUND

In general, electronic devices have various functions and perform complex functions. The electronic devices may be connected to communicate with each other. At this time, the electronic devices may be connected to each other wirelessly or through a wire. That is, the electronic devices may be connected to each other through a wireless communication network for intercommunication. The electronic devices may perform a call through the wireless communication network. To this end, the electronic devices may generate a public security key and utilize it to establish a secure call session. Thus, the electronic devices may exchange calls or messages securely through the wireless communication network.

However, the communication between the electronic devices remains vulnerable to external attacks. That is, the security key of the electronic devices may be exposed to the external attack and altered. Accordingly, the content of a call or message of the electronic devices may be exposed. For example, an eavesdropper (e.g., sometimes referred to as a "man in the middle") may control the security key to listen to the content of a call between the electronic devices. In addition, messages of the electronic devices may be exposed by external attack. As a result, messages between the electronic devices may be blocked, or the content of the message may be changed.

SUMMARY

Accordingly, the present disclosure provides an electronic device, which can efficiently protect communication, and a communication method thereof.

In accordance with an aspect of the present disclosure, a method of communication in an electronic device is provided, including detecting a request for establishing a call session, generating a new security key from a preset security key, renewing the preset security key by setting the generated new security key as a current preset security key, and establishing the call session based on the generated new security key.

In accordance with an aspect of the present disclosure, an electronic device is provided, including a communication unit, a storage unit for storing a preset security key, and at least one processor operatively coupled to the storage unit and configured to: detect via the communication unit a request for establishing a call session, generating a new security key based on a preset security key, renewing the preset security key by setting the generated new security key as a current preset security key, and establishing the call session based on the generated new security key.

An electronic device and a communication method thereof according to the present disclosure can effectively protect communication with an external device.

That is, when establishing a call session with the external device, the electronic device can generate and set a security key. At this time, the electronic device can generate a new security key from a preset security key. Accordingly, between the electronic device and the external device, the security key can be protected from an external attack. That is, between the electronic device and the external device, a man in the middle cannot secure the set security key, neither can he generate the new security key from the preset security key. Therefore, the call session can be better protected between the electronic device and the external device. Further, a content of the call may be prevented from being leaked between the electronic device and the external device.

The electronic device can provide a "trust level" of the external device. At this time, the electronic device can detect a number of establishments of the call session with the external device from the preset security key and thereby determine a trust level. Accordingly, a user of the electronic device can view, receive or detect the trust level of the external device and determine whether to communicate with the external device based on the trust level.

The electronic device can protection-process a message or analyze the protection-processed message by using the preset security key. Accordingly, between the electronic device and the external device, the message can be protected from an external attack. That is, even though a man in the middle secures the protection-processed message between the electronic device and the external device, the man in the middle is still prevented from analyzing the message. Accordingly, the content of the message may be prevented from exposure during communication between the electronic device and the external device.

BRIEF DESCRIPTION OF THE DRAWINGS

The above and other aspects and features of the present disclosure will be more apparent from the following detailed description taken in conjunction with the accompanying drawings, in which:

FIG. 6A, FIG. 6B, FIG. 6C, FIG. 7A, FIG. 7B, FIG. 7C, FIG. 8A, FIG. 8B and FIG. 8C illustrate screen examples for describing a trust level display operation according to an embodiment of the present disclosure;

DETAILED DESCRIPTION

Figure 1:
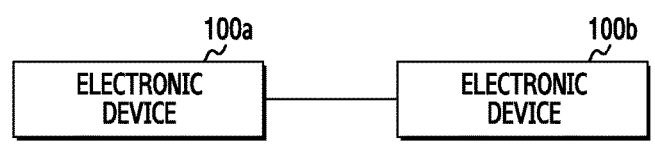
FIG. 1 is a block diagram illustrating a communication system to which the present disclosure is applied.

Hereinafter, embodiments of the present disclosure will be described in more detail with reference to the accompanying drawings. Here, it is noted that identical reference numerals denote the same structural elements in the accompanying drawings. The detailed description of known functions and structures will be omitted to avoid an unclearness of the subject matter of the present disclosure.

FIG. 1 is a block diagram illustrating a communication system to which the present disclosure is applied.

Referring to FIG. 1, a communication system 10 to which the present disclosure is applied includes a plurality of electronic devices 100a and 100b. The electronic devices 100a and 100b may be communicatively coupled and/or connected to each other and exchange signals. The electronic devices 100a and 100b may be the same as or different from each other. With respect to one of the electronic devices 100a, the remaining electronic devices 100b (e.g., except for the one electronic device 100a) may be described as "external" devices.

The electronic devices 100a and 100b may be communicatively connected through a wire. The electronic devices 100 and 100b may be communicatively connected to each other through a cable. The electronic devices 100 and 100b may execute an interface through a cable. The electronic devices 100a and 100b may exchange data through a wire.

Meanwhile, the electronic devices 100a and 100b may be communicatively connected wirelessly. The electronic devices 100a and 100b may be connected to each other through a communication network. The electronic devices 100a and 100b may communicate through a communication network. The electronic devices 100a and 100b may execute a call through a base station (not shown). The call may include a voice call, an image call, and an Internet call. Alternatively, the electronic devices 100a and 100b may exchange messages through a server (not shown). The messages may include a short message, a multimedia message, an instant message, a social media message, and e-mail.

Figure 2:
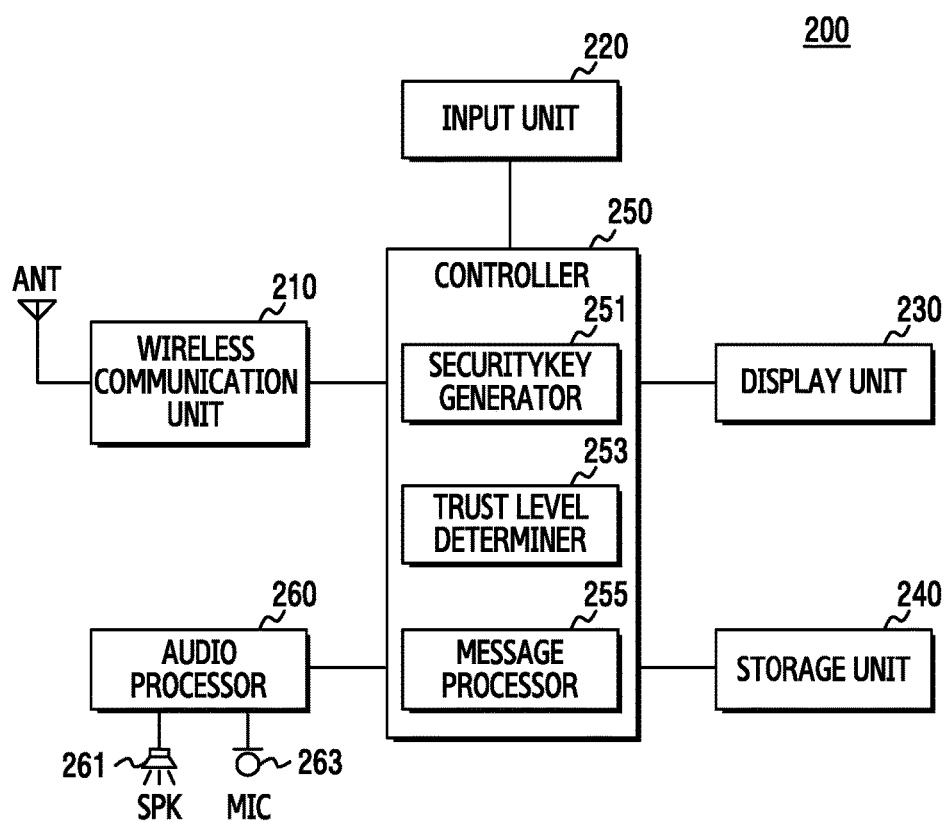
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, an electronic device 200 according to the present embodiment includes a wireless communication unit 210, an input unit 220, a display unit 230, a storage unit 240, a controller 250, and an audio processor 260.

The wireless communication unit 210 performs wireless communication in the electronic device 200. At this time, the wireless communication unit 210 may access a communication network. The communication network may include a mobile communication network, a data communication network, and a short range communication network. The wireless communication unit 210 may communicate with an external device (not shown) through various communication schemes. For example, the external device may include an electronic device, a base station, a server, and a satellite. The communication schemes may include Long Term Evolution (LTE), Wideband Code Division Multiple Access (WCDMA), Global System for Mobile Communications (GSM), Wi-Fi, Bluetooth, and Near Field Communications (NFC).

The input unit 220 generates input data in the electronic device 200. At this time, the input unit 220 may generate the input data according to a user input of the electronic device 200. The input unit 220 may include at least one input means such as a key pad, a dome switch, a physical button, a touch panel, a jog & shuttle, and a sensor.

The display unit 230 outputs display data. The display unit 230 may include a Liquid Crystal Display (LCD), a Light Emitting Diode (LED) display, an Organic LED (OLED) display, a Micro Electro Mechanical System (MEMS) display, and an electronic paper display. The display unit 230 may be coupled with the input unit 220 for implementation as a touch screen.

The storage unit 240 stores operation programs of the electronic device 200. At this time, the storage unit 240 may generate a security key (e.g., "5") and store a program for establishing a call session. The storage unit 240 may determine a trust level according to a number of establishments of the call session, and store a program for displaying the trust level. The storage unit 240 may "protection-process" a message, transmit the protection-processed message, and store a program for receiving the protection-processed message. The storage unit 240 stores data generated while the operation programs are executed. At this time, the storage unit 240 may store the security key (S). The storage unit 240 may store the security key (S) according to each external device. Further, the storage unit 240 may store contact information. The contact information may include one or more profile names, profile images corresponding to the profile names, and identification data of one or more external devices. The profile names may be classified into one or more groups, and the contact information may further include a group name of a group corresponding to the profile name.

The controller 250 controls the overall operation of the electronic device 200. At this time, the controller 250 may communicate with an external device through a communication network. Specifically, the controller 250 may generate the security key (S), establish the call session, and execute the call. The controller 250 may determine the trust level according to the number of establishments of the call session.

The controller 250 may display the trust level in the contact information. The controller 250 may protection-process a message and transmit the protection-processed message. The controller 250 may process the message by using the security key (S). The controller 250 may receive the protection-processed message. The controller 250 may analyze the message by using the security key (S). The controller 250 may include a security key generator 251, a trust level determiner 253, and a message processor 255.

The security key generator 251 may generate the security key (S) for establishing the call session. The security key generator 251 may initialize and renew the security key (S). At this time, the security key generator 251 may determine whether a preset security key ($S_{i-1}$) exists in response to a request for establishing the call session. When the preset security key ($S_{i-1}$) does not exist, the security key generator 251 may generate and set an initial security key ($S_0$). If the preset security key ($S_{i-1}$) does exist, then the security key generator 251 may generate a new security key ($S_i$) from the preset security key ($S_{i-1}$). Further, the security key generator 251 may renew the security key from the preset security key ($S_{i-1}$) to the new security key ($S_i$). That is, the security key generator 251 may change the preset security key ($S_{i-1}$) into the new security key ($S_i$).

The trust level determiner 253 may determine a "trust level" of the external device. At this time, the trust level determiner 253 may determine the trust level of the external device according to a number of times that the call session was established (e.g., referred to as "establishments of the call session"). The trust level determiner 253 may compare the number of establishments of the call session with at least one preset threshold and determine the trust level of the external device. The trust level determiner 253 may select, set or determine an indicator corresponding to the trust level of the external device. For example, the trust level determiner 253 may set at least one of a color, an image, or text, corresponding to the trust level.

The message processor 255 may process and transmit a message. At this time, the message processor 255 may process the message by using the security key (S). The message processor 255 may encrypt the message by using the security key (S). The message processor 255 may receive and process the message. At this time, the message processor 255 may process the message by using the security key (S). The message processor 255 may decrypt the message by using the security key (S).

The audio processor 260 processes an audio signal. At this time, the audio processor 260 may include a speaker (e.g., "SPK") 261 and a microphone (e.g., "MIC") 263. That is, the audio processor 260 may reproduce an audio signal output from the controller 250 through the speaker 261. Further, the audio processor 260 may transfer an audio signal generated by the microphone 263 to the controller 250.

Figure 3:
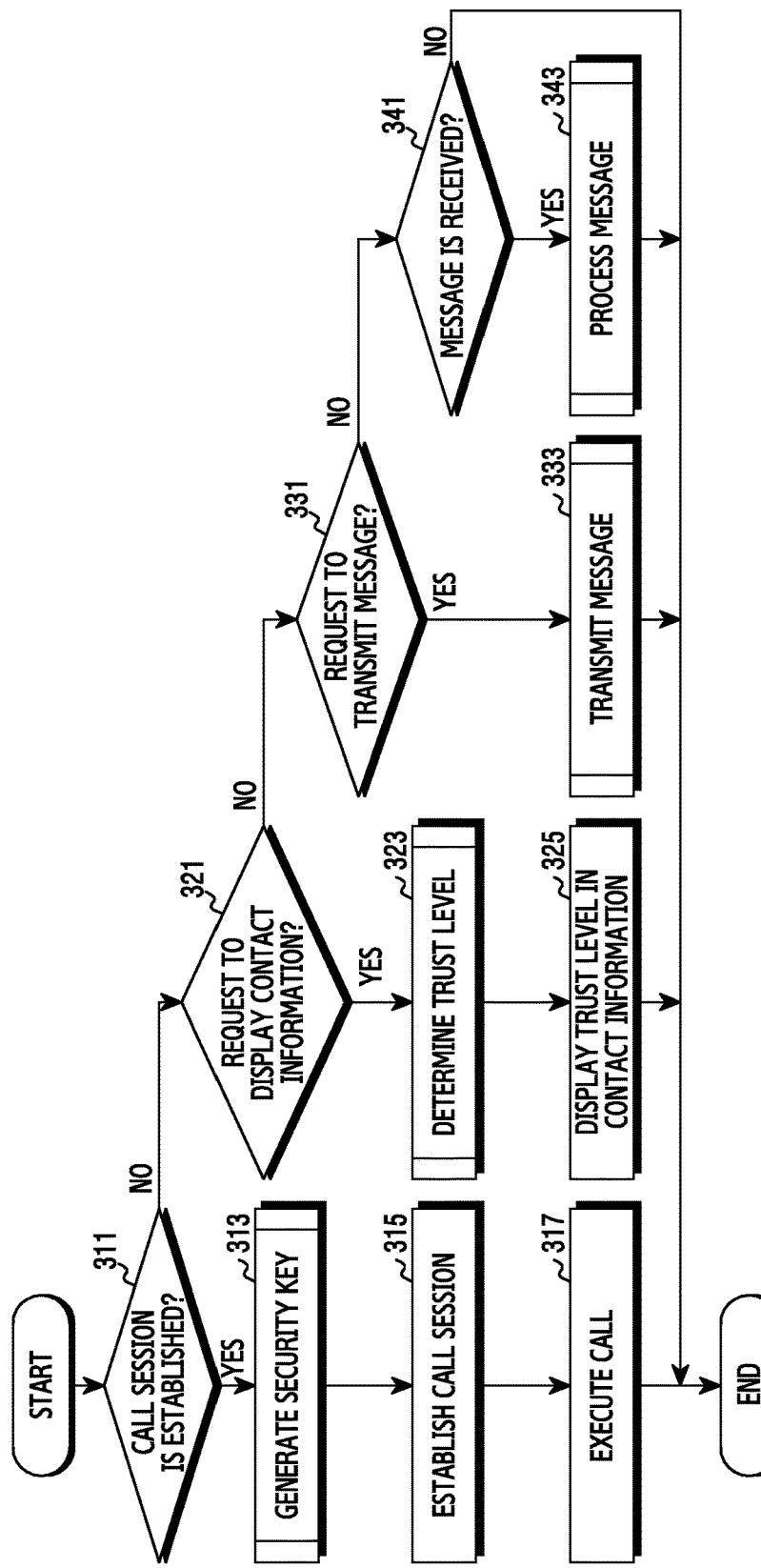
FIG. 3 is a flowchart illustrating a process of performing a communication method according to an embodiment of the present disclosure.

FIG. 3 is a flowchart illustrating a process of performing a communication method according to an embodiment of the present disclosure. FIGS. 6, 7, and 8 illustrate screen examples for describing a trust level display operation of FIG. 3.

Referring to FIG. 3, when a request for establishing a call session is generated, the process of performing the communication method according to the present embodiment begins with the detection of a request for establishment of the call session by the controller 250 in operation 311. At this time, when receiving a call from an external device, the controller 250 may detect the call as a request for establishing the call session. When the call is received through the wireless communication unit 210, the controller 250 may detect the call. The controller 250 may receive, retrieve or extract identification data of the external device. Alternatively, when the call is transmitted to the external device, the controller 250 may detect the call as the request for establishing the call session. When a user input for transmitting the call is generated through the input unit 220, the controller 250 may detect the user input. Further, the controller 250 may grasp identification data of the external device.

Next, if the request for establishment of the call session is detected (311), then the controller 250 generates a security key (S) in operation 313. At this time, the controller 250 may generate the security key (S) according to whether a preset security key ($S_{i-1}$) exists or not. That is, when the preset security key ($S_{i-1}$) does not exist, the controller 250 may generate an initial security key ($S_0$). Meanwhile, when the preset security key ($S_{i-1}$) exists, the controller 250 may generate a new security key ($S_i$). The controller 250 may generate the new security key ($S_i$) from the preset security key ($S_{i-1}$).

Figure 4:
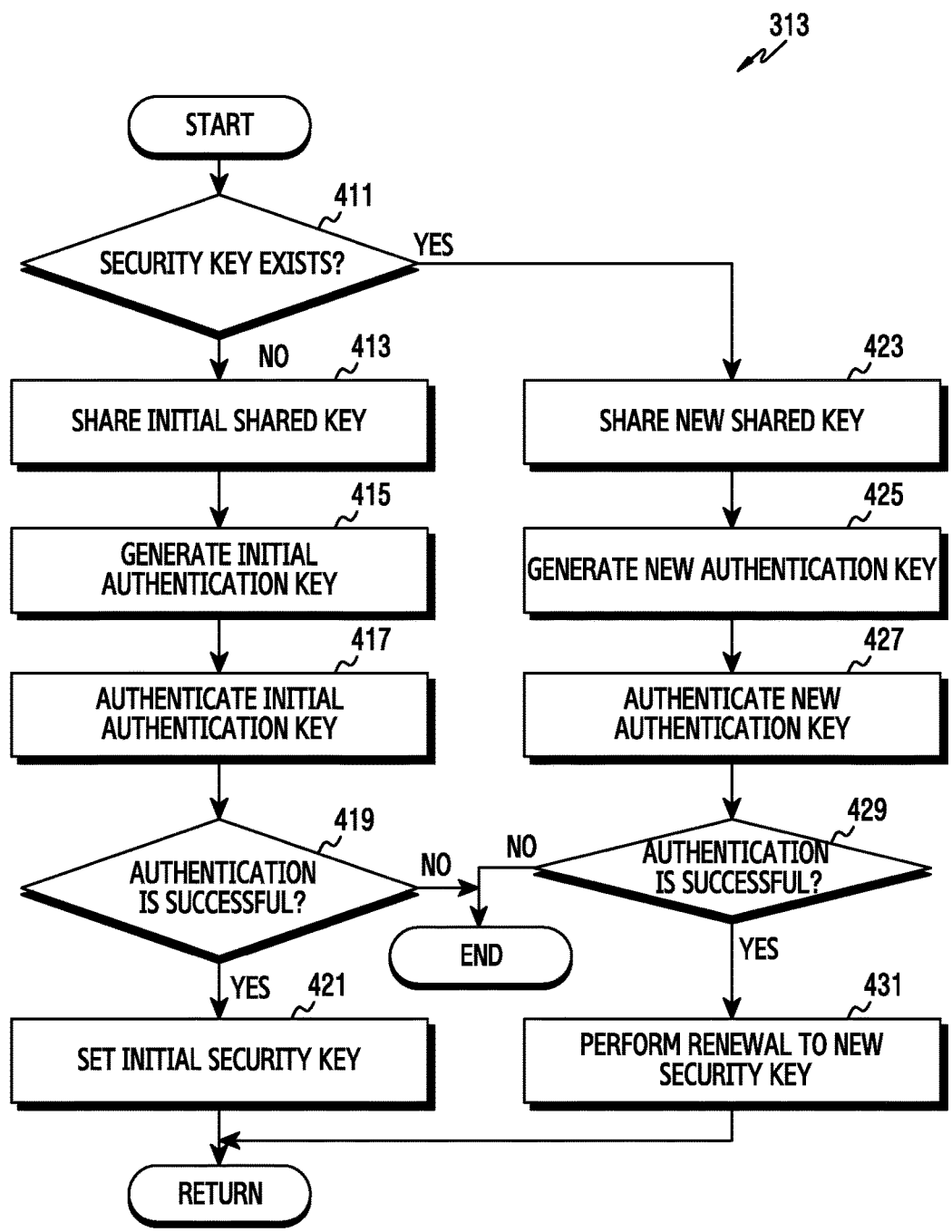
FIG. 4 is a flowchart illustrating a process of performing a security key generation operation according to an embodiment of the present disclosure.

FIG. 4 is a flowchart illustrating a process of performing the security key generation operation of FIG. 3.

Referring to FIG. 4, the process of performing the security key generation operation according to the present embodiment starts from operation 411 in which the controller 250 determines whether the preset security key ($S_{i-1}$) exists. At this time, the storage unit 240 may store the preset security key ($S_{i-1}$) in accordance with identification data of the external device. If a call session with the external device has been established, the preset security key ($S_{i-1}$) may in fact exist. Meanwhile, if the call session with the external device has not previously been established, the preset security key ($S_{i-1}$) may not exist.

When it is determined that the preset security key ($S_{i-1}$) does not exist in operation 411, the controller 250 shares the initial shared key (e.g., K0') in operation 413. The initial shared key (K0') may include an initial transmission key and an initial reception key. At this time, the controller 250 may generate the initial transmission key and transmit the generated initial transmission key to the external device. Then, the controller 250 may receive the initial reception key from the external device. That is, the initial reception key may be generated by the external device. Accordingly, the controller 250 may share the initial shared key (K0') with the external device. The controller 250 may generate and share the initial shared key (K0') by using, for example, a Diffie-Hellman protocol (DHP).

For example, the electronic device 200 and the external device may share a finite cyclic group (e.g., "G") and the storage unit 240 may store the finite cyclic group. The finite cyclic group may be a set of a plurality of elements, and each of the elements may be determined as $g^n$. Here, "g" may refer to a generator of the finite cyclic group and may be exposed to the outside, and n may be the number of elements which is a natural number. The controller 250 may select a predetermined natural number "a" and generate $g^a$ among the elements of the finite cyclic group as the initial transmission key. The controller 250 may transmit the initial transmission key to the external device.

Meanwhile, the controller 250 may receive the initial reception key from the external device. At this time, the controller 250 may receive $g^b$ among the elements of the finite cyclic group as the initial reception key from the external device. That is, the external device may select a predetermined natural number b and generate $g^b$ among the elements of the finite cyclic group as the initial reception key. The external device may transmit the initial reception key to the electronic device 200.

Subsequently, the controller 250 generates an initial authentication key (K0) in operation 415. That is, the controller 250 generates the initial authentication key (K0) from the initial shared key (K0'). At this time, the controller 250 may generate the initial authentication key (K0) by using the initial transmission key and the initial reception key. Specifically, the controller 250 may calculate the initial authentication key (K0) by using the decile of the initial transmission key, that is, "a," and the initial reception key, that is, gb. The controller 250 may calculate the initial authentication key (K0) as show in equation (1) below. Similarly, the external device may calculate the initial authentication key (K0).

$$K0 = (g^b)^a = (g^a)^b \qquad (1)$$

The controller 250 may continuously perform an authentication with the external device by using the initial authentication key (K0) in operation 417. At this time, the controller 250 may generate a transmission authentication code from the initial authentication key (K0). For example, the controller 250 may generate a Short Authentication String (SAS) of the electronic device 200 from the initial authentication key (K0). Similarly, the external device may generate a reception authentication code. The controller 250 may transmit the transmission authentication code to the external device. Accordingly, the controller 250 may receive the reception authentication code from the external device. For example, a user of the electronic device 200 and a user of the external device may exchange their authentication codes through a variety of means, including, for example, exchange by voice. Thereafter, the controller 250 determines whether the authentication with the external device is successful in operation 419. At this time, the controller 250 may determine whether the transmission authentication code and the reception authentication code are the same. Meanwhile, when a "Man In The Middle attack" (or "MITM") is generated between the electronic device 200 and the external device, the transmission authentication code and the reception authentication code may be different.

Lastly, when it is determined that the authentication with the external device is successful in operation 419, the controller 250 sets the initial security key ($S_0$) in operation 421. For example, it is determined that the transmission authentication code and the reception authentication code are the same, the controller 250 may determine that the authentication with the external device is successful. That is, the controller 250 generates the initial security key ($S_0$) from the initial authentication key (K0). At this time, the controller 250 may input the initial authentication key (K0) into a preset cryptographic hash function Q and output a hash value (Q(K0)). The cryptographic hash function Q may be preset to not only the electronic device 200 but also the external device. The controller 250 may generate the initial security key ($S_0$) based on the hash value (Q(K0)) of the initial authentication key (K0) and a key identifier (0). The controller 250 may generate the initial security key ($S_0$) as shown in equation (2) below. The controller 250 sets the initial security key ($S_0$) in accordance with identification data of the external device. At this time, the controller 250 may store the initial security key ($S_0$) in the storage unit 240 in accordance with the identification data of the external device. Thereafter, the controller 250 may end the process of performing the security key generation operation according to the present embodiment and return to FIG. 3.

$$S_0\{Q(K0), 0\} \qquad (2)$$

Meanwhile, when it is determined that the authentication with the external device fails in operation 419, the controller 250 ends the process of performing the communication method according to the present embodiment. For example, when it is determined that the transmission authentication code and the reception authentication code are different, the controller 250 may determine that the authentication with the external device fails. That is, the controller 250 blocks the call session. Accordingly, the controller 250 does not execute the call.

Meanwhile, when it is determined that the preset security key ($S_{i-1}$) exists in operation 411, the controller 250 shares a new shared key (Ki') in operation 423. At this time, the controller 250 may generate a new transmission key and transmit the generated new transmission key to the external device. The controller 250 may receive a new reception key from the external device. The new reception key may be generated by the external device. The controller 250 may generate the new shared key (Ki') by using the new transmission key and the new reception key. Accordingly, the controller 250 may share the new shared key (Ki') with the external device. For example, the controller 250 may generate and share the new shared key (Ki') by using a Diffie-Hellman protocol (DHP). Since a method by which the controller 250 shares the new shared key (Ki') is similar to a method by which the controller 250 shares the initial shared key (K0') and a method by which the controller 250 generates the initial authentication key (K0), a detailed description thereof will be omitted.

Subsequently, the controller 250 generates a new authentication key (Ki) in operation 425. That is, the controller 250 generates the new authentication key (Ki) from the preset security key ($S_{i-1}$) and the new shared key (Ki'). At this time, the controller 250 may input a hash value (Q(K(i−1)) of the preset security key (Si−1) and the new shared key (Ki') into a preset cryptographic hash function F, and output the new authentication key (Ki). The controller 250 may further input Additional Information (AI) into the cryptographic hash function F. The cryptographic hash function F and the AI may be preset to not only the electronic device 200 but also the external device. The controller 250 may calculate the new authentication key (Ki) as shown in equation (3) below. For example, the cryptographic hash functions Q and F may be SHA256 algorithms based on FIPS 180-4. In this case, the controller 250 may calculate the new authentication key (Ki) through a concatenation operation (∥ ∥) as shown in equation (4) below. Similarly, the external device may calculate the new authentication key (Ki).

$$Ki = F(Q(K(i-1)), Ki', AI) \qquad (3)$$

$$Ki = SHA256(SHA256(K(i-1))\|Ki'\|\text{"NEW KEY"}) \qquad (4)$$

Continuously, the controller 250 performs an authentication with the external device by using new authentication key (Ki) in operation 427. At this time, the controller 250 may generate a transmission comparison key (V) from the new authentication key (Ki). The controller 250 may input the new authentication key (Ki) into the cryptographic hash function Q, and output a transmission comparison key (Vi) as a hash value (Q(Ki)) of the new authentication key (Ki). That is, the controller 250 may generate the transmission comparison key (Vi) as shown in equation (5) below. The controller 250 may transmit the transmission comparison key (Vi) to the external device. Similarly, the external device may generate a reception comparison key (Vi'). Accordingly, the controller 250 may receive the reception comparison key (Vi') from the external device. Thereafter, the controller 250 determines whether the authentication with the external device is successful in operation 429. At this time, the controller 250 may determine whether the transmission comparison key (Vi) and the reception comparison key (Vi') are the same. Meanwhile, when MITM is generated between the electronic device 200 and the external device, the transmission comparison key (Vi) and the reception comparison key (Vi') may be different.

$$Vi = Q(Ki) \qquad (5)$$

Lastly, when it is determined that the authentication with the external device is successful in operation 429, the controller 250 renews the security key from the preset security key ($S_{i-1}$) to the new security key ($S_i$) in operation 431. At this time, when it is determined that the transmission comparison key (Vi) and the reception comparison key (Vi') are the same, the controller 250 may determine that the authentication with the external device is successful. That is, the controller 250 generates the new security key (Si) from the new authentication key (Ki). At this time, the controller 250 may generate a key identifier (i) of the new security key ($S_i$) by increasing the key identifier by 1 from a key identifier (i−1) of the preset security key ($S_{i-1}$). The controller 250 may calculate and set a number of establishments of the call session by increasing the key identifier by 1 from the key identifier (i). The controller 250 may generate the new security key ($S_i$) based on the hash value (Q(Ki)) of the new authentication key (Ki) and the key identifier (i). The controller 250 may generate the new security key (Si) as shown in equation (6) below. The controller 250 renews the security key from the preset security key ($S_{i-1}$) to the new security key ($S_i$) in accordance with identification data of the external device. The controller 250 may change the preset security key ($S_{i-1}$) to the new security key ($S_i$). At this time, the controller 250 may delete the preset security key ($S_{i-1}$) and store the new security key ($S_i$) in the storage unit 240 in accordance with the identification data of the external device. Thereafter, the controller 520 may end the process of performing the security key generation operation according to the present embodiment and return to FIG. 3.

$$S_i = \{Q(Ki), i\} \quad (6)$$

Meanwhile, when it is determined that the authentication with the external device fails in operation 429, the controller 250 ends the process of performing the communication method according to the present embodiment. At this time, when it is determined that the transmission comparison key (V) and the reception comparison key (V') are different, the controller 250 may determine that the authentication with the external device has failed. That is, the controller 250 blocks the call session. Accordingly, the controller 250 does not execute the call.

Returning to FIG. 3, if the call was not blocked, then the controller 250 establishes the call session in operation 315. At this time, the controller 250 establishes the call session by using the preset security key ($S_{i-1}$). The controller 250 executes the call in operation 317. That is, the controller 250 executes the call with the external device. Accordingly, between the electronic device 200 and the external device, the call is protected. Thereafter, the controller 250 ends the process of performing the communication method according to the present embodiment.

Meanwhile, when the request for establishing the call session is not detected in operation 311, the controller 250 may detect whether there is generation of a request for displaying contact information in operation 321. When a wireless signal for displaying the contact information is received through the wireless communication unit 210, the controller 250 may detect the signal. Alternatively, the controller 250 may determine whether a user input for displaying the contact information is generated through the input unit 220. Alternatively, the input for display the contact information may be an audio signal for displaying the contact information received through the audio processor 260, the audio signal detected by the controller 250.

Next, if a request for displaying contact information is received (321), the controller 250 determines a trust level in operation 323. At this time, the controller 250 may determine the trust level according to whether the preset security key ($S_{i-1}$) exists. The controller 250 may determine the trust level according to the number of establishments of the call session corresponding to the external device. The number of establishments of the call session may be detected from the preset security key ($S_{i-1}$). That is, when the preset security key ($S_{i-1}$) exists, the controller 250 may determine the trust level according to the number of establishments of the call session corresponding to the external device. For example, the trust level includes a first level, a second level, and a third level. The second level is lower than the first level, and the third level is lower than the second level.

For example, the controller 250 may determine the trust level according to each external device. Even though one piece of contact information includes pieces of identification data for a plurality of external devices, the controller 250 may determine the trust level corresponding to each of the external devices. Alternatively, the controller 250 may determine the trust level individually according to each piece of contact information. Even though one piece of contact information includes pieces of identification data of a plurality of external devices, the controller 250 may analyze trust levels of each of the external devices and determine the respective trust levels corresponding to the contact information. Alternatively, the controller 250 may determine the trust level according to groups including one or more external devices. When one particular group includes pieces of identification data of a plurality of external devices, the controller 250 may analyze trust levels of the external devices and determine the trust level corresponding to each of the groups.

Figure 5:
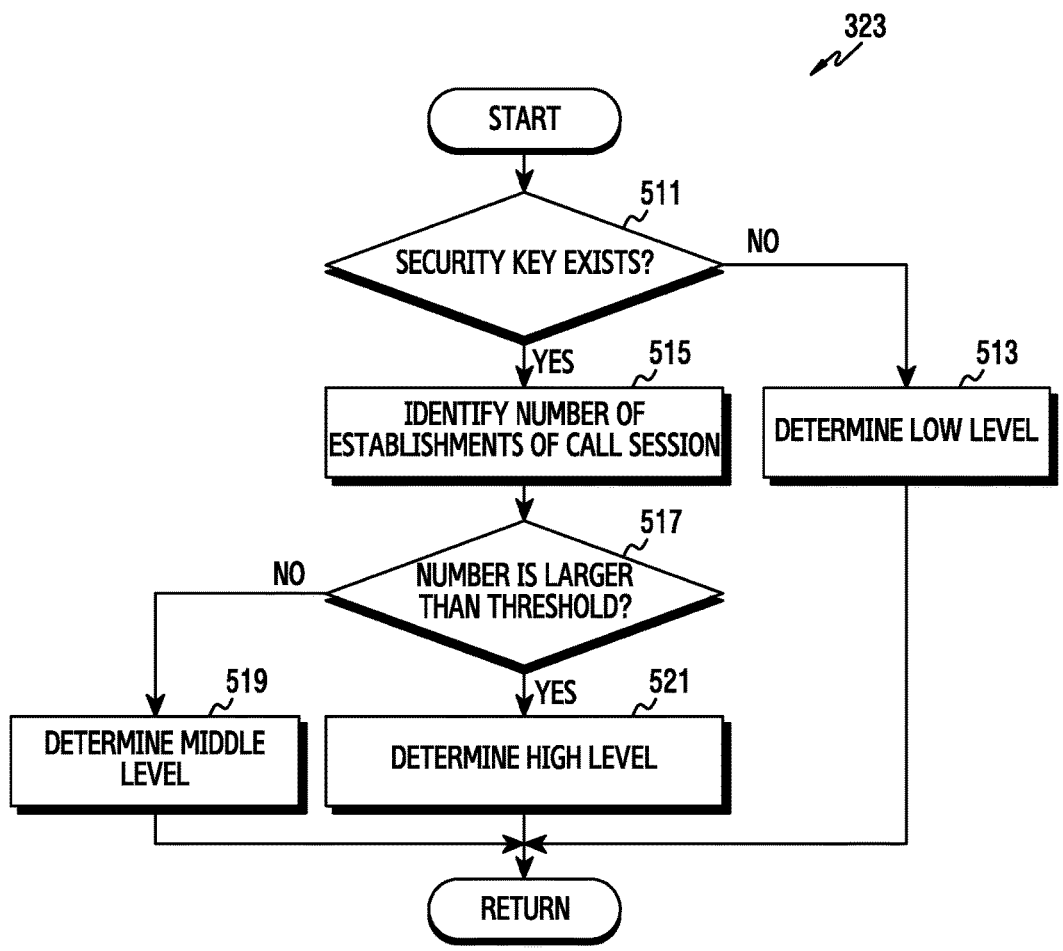
FIG. 5 is a flowchart illustrating a process of performing a trust level determination operation according to an embodiment of the present disclosure.

FIG. 5 is a flowchart illustrating a process of performing the trust level determination operation of FIG. 3.

Referring to FIG. 5, the process of performing the trust level determination operation according to the present embodiment starts from operation 511 in which the controller 250 detects whether the preset security key ($S_{i-1}$) exists or not. At this time, the controller 250 may detect whether the preset security key ($S_{i-1}$) exists in accordance with the identification data of the external device. If a call session with the external device has been established, the preset security key ($S_{i-1}$) may exist. Meanwhile, if the call session with the external device has not previously been established, the preset security key ($S_{i-1}$) may not exist. When the preset security key ($S_{i-1}$) exists, the storage unit 240 may store the preset security key ($S_{i-1}$) according to each external device.

When it is determined that the preset security key ($S_{i-1}$) does not exist in operation 511, the controller 250 determines that the trust level corresponds to a "low" level representing the third level in operation 513. A value for the trust level may be selected from a hierarchy of distinctive values, wherein a "low" value may indicate a bottommost or minimized trust level value. Similarly, "medium" or "high" values may indicate mean or maximal values in the trust level hierarchy. For example, a grade of three colors of red, yellow and green may be used to indicate low, medium and high. Further gradations are possible, such as a scale of values (e.g., 1-100). Thereafter, the controller 250 ends the process of performing the trust level determination operation according to the present embodiment and returns to FIG. 3.

Meanwhile, when it is determined that the preset security key ($S_{i-1}$) exists in operation 511, the controller 250 identifies a number of establishments of the call session in operation 515. At this time, the controller 250 may detect the number of establishments of the call session from the preset security key ($S_{i-1}$). The controller 250 may detect the number of establishments of the call session from the key identifier (i–1) of the preset security key ($S_{i-1}$). That, is the controller 250 may calculate the number of establishments of the call session by increasing the key identifier by 1 from the key identifier (i–1) of the preset security key ($S_{i-1}$). Thereafter, the controller 250 may compare the number of establishments of the call session with a preset threshold in operation 517. At this time, the controller 250 may determine whether the number of establishments of the call session is larger than the threshold.

When it is determined that the number of establishments of the call session is equal to or smaller than the threshold in operation 517, the controller 250 determines that the trust level corresponds to a "middle" level representing the second level (e.g., a central or middle position within the hierarchy of distinctive values) in operation 519. Thereafter, the controller 250 ends the process of performing the trust level determination operation according to the present embodiment and returns to FIG. 3.

When it is determined that the number of establishments of the call session is larger than the threshold in operation 517, the controller 250 determines that the trust level corresponds to a "high" level representing the first level (e.g., a topmost or maximum value) in operation 521. Thereafter, the controller 250 ends the process of performing the trust level determination operation according to the present embodiment and returns to FIG. 3.

Next, referring again to FIG. 3, the controller 250 determines a trust level of the contact information in operation 325. At this time, the controller 250 may determine an indicator corresponding to the trust level. The controller 250 may determine at least one of a color, an image, or text corresponding to the trust level. For example, when the trust level corresponds to the low level, the controller 250 may determine a red color or text such as "Untrusted" or "Low". Alternatively, when the trust level corresponds to the middle level, the controller 250 may determine a yellow color or text such as "Middle trust" or "Middle". Alternatively, when the trust level corresponds to the high level, the controller 250 may determine a green color or text such as "Trusted" or "High". Thereafter, the controller 250 ends the process of performing the communication method according to the present embodiment.

For example, the controller 250 may display the trust level according to each external device as illustrated in FIG. 6. At this time, the controller 250 may display identification data 611 of the external device with a color corresponding to the trust level as illustrated in FIG. 6(A). Alternatively, the controller 250 may display a color image 613 corresponding to the trust level in accordance with the identification data 611 of the external device as illustrated in FIG. 6(B). Alternatively, the controller 250 may display text 615 corresponding to the trust level in accordance with the identification data 611 of the external device as illustrated in FIG. 6(C).

Figures 7A, 7B, 7C:
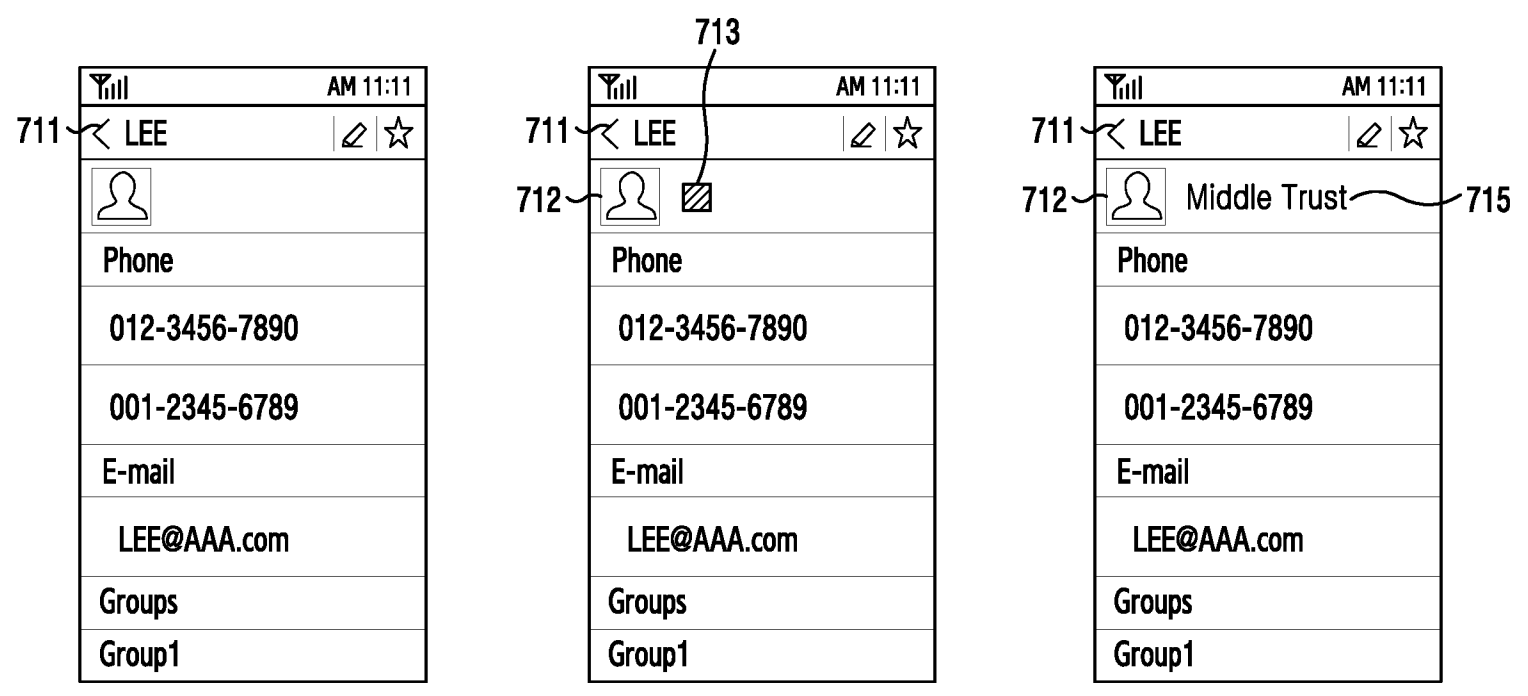

Meanwhile, the controller 250 may determine the trust level according to each piece of contact information as illustrated in FIG. 7. At this time, the controller 250 may display a profile name 711 with a color corresponding to the trust level as illustrated in FIG. 7(A). Alternatively, the controller 250 may display a color image 713 corresponding to the trust level in accordance with a profile image 712 as illustrated in FIG. 7(B). Alternatively, the controller 250 may display text 715 corresponding to the trust level in accordance with the profile image 712 as illustrated in FIG. 7(C).

Figures 8A, 8B, 8C:
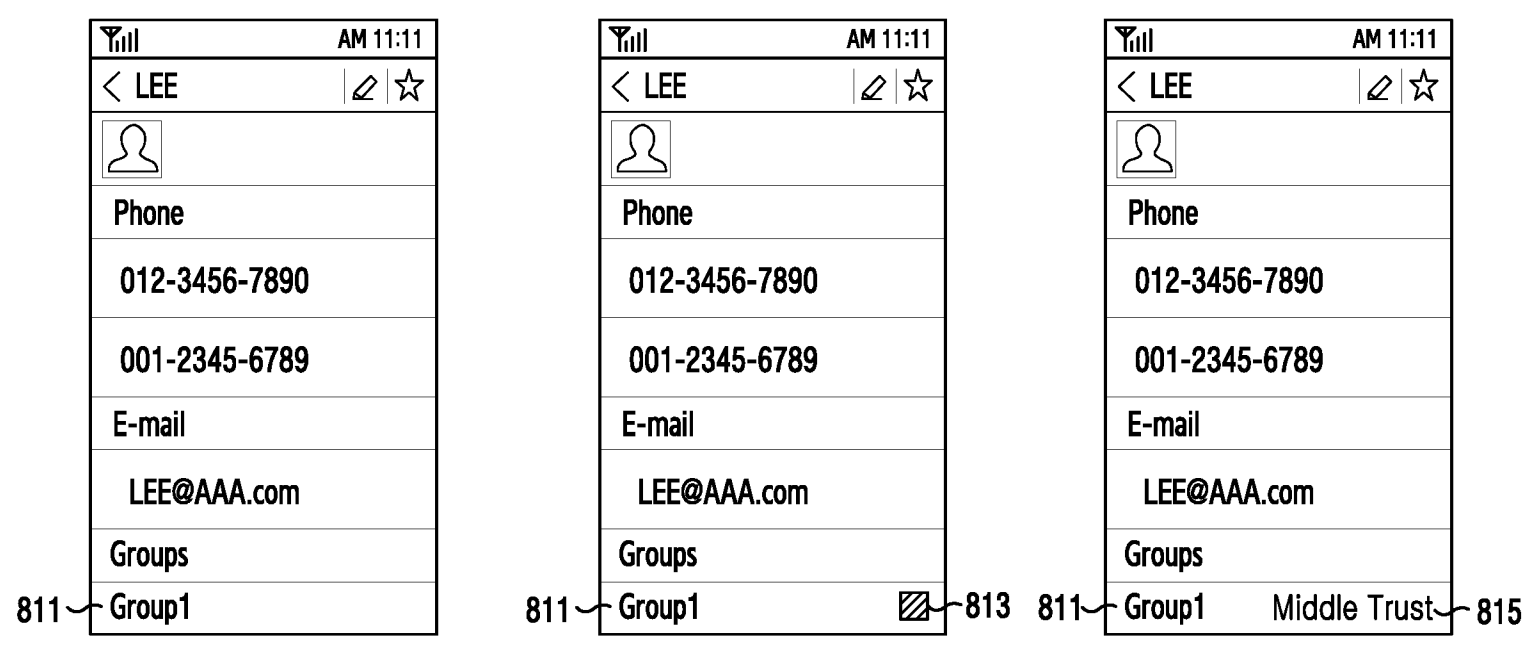

Meanwhile, the controller 250 may determine the trust level according to each group as illustrated in FIG. 8. At this time, the controller 250 may display a group name 811 with a color corresponding to the trust level as illustrated in FIG. 8(A). Alternatively, the controller 250 may display a color image 813 corresponding to the trust level in accordance with the group name 811 as illustrated in FIG. 8(B). Alternatively, the controller 250 may display text 815 corresponding to the trust level in accordance with the group name 811 as illustrated in FIG. 8(C).

Meanwhile, returning to FIG. 3, when the request for displaying the contact information is not detected in operation 321, the controller 250 may detect whether a request for transmitting a message is detected in operation 331. At this time, after generating the message, the controller 250 may detect the request for transmitting the message to the external device. When a wireless signal for transmitting the message is received through the wireless communication unit 210, the controller 250 may detect the wireless signal. Alternatively, when a user input for transmitting the message is generated through the input unit 220, the controller 250 may detect the user input. Alternatively, when an audio signal for transmitting the message is received through the audio processor 260, the controller 250 may detect the audio signal.

Next, the controller 250 transmits the message in operation 333. At this time, the controller 250 may process the message and transmit the processed message to the external device. The controller 250 may process the message (M) by using the security key (S). The controller 250 may encrypt the message (M) by using the security key (S). Thereafter, the controller 250 ends the process of performing the communication method according to the present embodiment.

Figure 9:
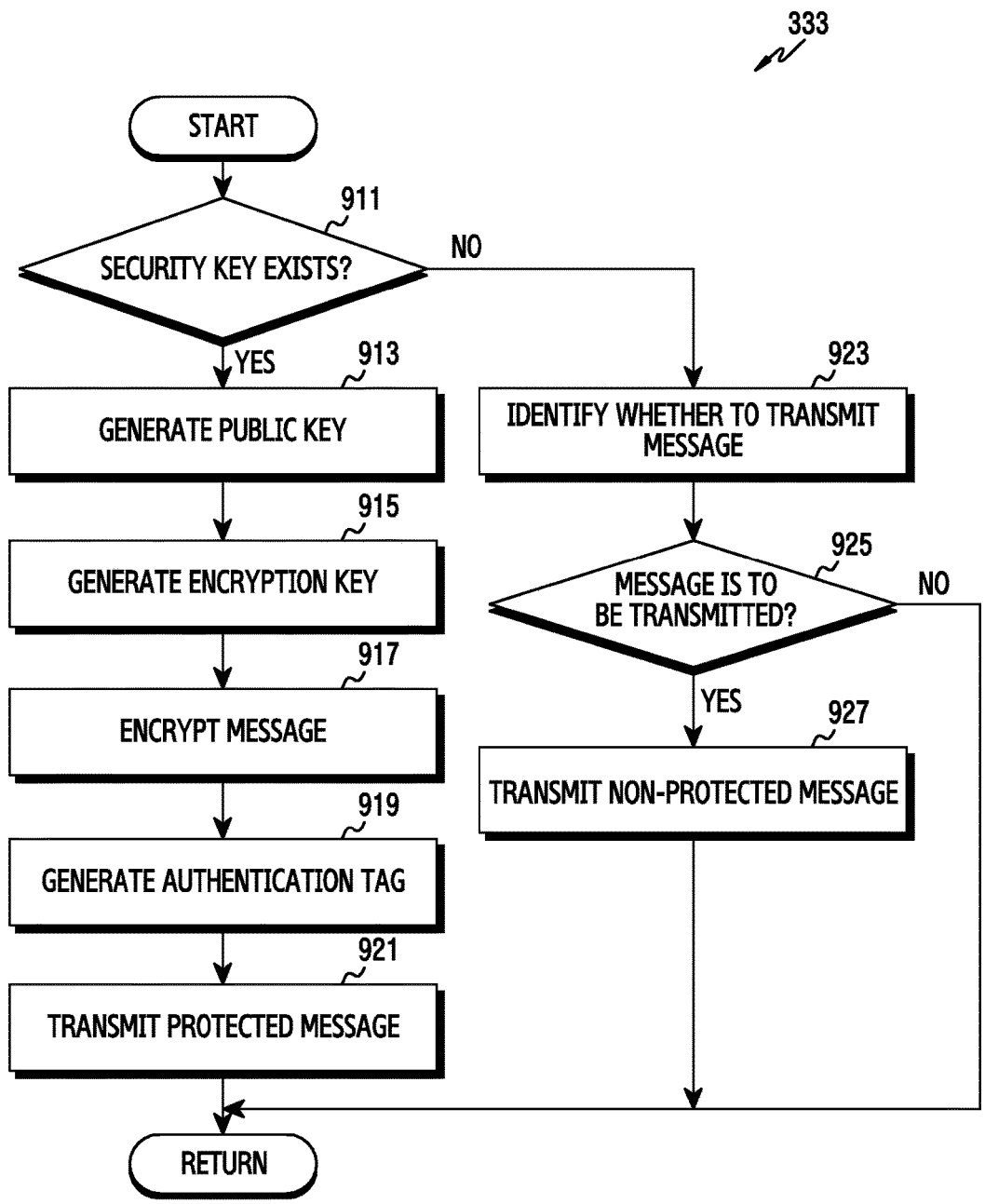
FIG. 9 is a flowchart illustrating a process of performing a message transmission operation according to an embodiment of the present disclosure.

FIG. 9 is a flowchart illustrating a process of performing the message transmission operation of FIG. 3.

Referring to FIG. 9, the process of performing the message transmission operation according to the present embodiment starts from operation 911 in which the controller 250 detects whether the preset security key ($S_{i-1}$) exists or not. At this time, the controller 250 may detect whether the preset security key ($S_{i-1}$) exists in accordance with the identification data of the external device. If a call session with the external device has been established, the preset security key ($S_{i-1}$) may exist. Meanwhile, if the call session with the external device has not previously been established, the preset security key ($S_{i-1}$) may not exist. The storage unit 240 may store the preset security key ($S_{i-1}$) according to each external device.

When it is determined that the preset security key ($S_{i-1}$) exists in operation 911, the controller 250 generates a public key (R) in operation 913. At this time, the controller 250 may generate a predetermined public key (R).

Subsequently, the controller 250 may generate an encryption key (KM) in operation 915. That is, the controller 250 may generate the encryption key (KM) from the preset security key ($S_{i-1}$) and the public key (R). At this time, the controller 250 may input a hash value (Q(K(i−1)) of the preset security key ($S_{i-1}$) and the public key (R) into a preset Key Derivation Function (KDF), and output the encryption key (KM). The controller 250 may further input identification data of the electronic device 200 and identification data of the external device into the KDF. The KDF may be preset to not only the electronic device 200 but also the external device. The controller 250 may calculate the encryption key (KM) as shown in equation (7) below. The identification data of the electronic device 200 may be expressed as "userID1" and the identification data of the external device may be expressed as "userID2". For example, the KDF may be a NIST SP 800-108 algorithm.

$$KM = KDF(Q(K(i-1)), \text{user ID2}, R) \quad (7)$$

Continuously, the controller 250 encrypts the message (M) in operation 917. That is, the controller 250 encrypts the message (M) by using the encryption key (KM). Accordingly, the controller 250 generates an encrypted message (C). The controller 250 generates an Authentication TAG (ATAG) in operation 919. That is, the controller 250 generates the authentication TAG (ATAG) based on the encryption key (KM) and the encrypted message (C). At this time, the controller 250 may input the encryption key (KM) and the message (M) into a preset cryptographic algorithm and output the encrypted message (C) and the authentication TAG (ATAG). The controller 250 may further input additional authentication information (A) into the cryptographic algorithm. The cryptographic algorithm and the additional authentication information (A) may be preset to not only the electronic device 200 but also the external device. The controller 250 may calculate the encrypted message (C) and the authentication TAG (ATAG) as shown in equation (8) below. For example, the cryptographic algorithm may be an Advanced Encryption Standard (AES)-Galois Counter Mode (GCM) cipher algorithm, for example, a NIST SP 800-38D algorithm.

$$\{C,ATAG\}=AESGCM(KM,M,A) \quad (8)$$

Lastly, the controller 250 transmits a protected message in operation 921. That is, the controller 250 generates the protected message based on the encryption key (KM), the encrypted message (C), and the authentication TAG (ATAG). The controller 250 may transmit the protected message to the external device. Thereafter, the controller 250 ends the process of performing the message transmission operation according to the present embodiment and returns to FIG. 3.

When it is determined that the preset security key $(S_{i-1})$ does not exist in operation 911, the controller 250 identifies whether to transmit the message (M) in operation 923. The controller 250 may inquire about whether to transmit the message (M) through the display unit 230. Thereafter, the controller 250 may identify whether to transmit the message (M) according to a response to the inquiry. The controller 250 may determine whether to transmit the message (M) in operation 925. When it is determined to transmit the message (M) in operation 925, the controller 250 transmits a non-protected message in operation 927. At this time, the controller 250 transmits the message (M) to the external device without protection processing. Thereafter, the controller 250 ends the process of performing the message transmission operation according to the present embodiment and returns to FIG. 3. Meanwhile, when it is determined to not transmit the message (M) in operation 925, the controller 250 ends the process of performing the message transmission operation according to the present embodiment and returns to FIG. 3.

Meanwhile, when the request for transmitting the message is not detected but the message is received in operation 331, the controller 250 detects the reception of the message in operation 341. That is, when the message is received through the wireless communication unit 210, the controller 250 detects the message.

Next, the controller 250 processes the message in operation 343. At this time, the controller 250 may process the message (M) by using the security key (S). The controller 250 may decrypt the message (M) by using the security key (S). Thereafter, the controller 250 ends the process of performing the communication method according to the present embodiment.

Figure 10:
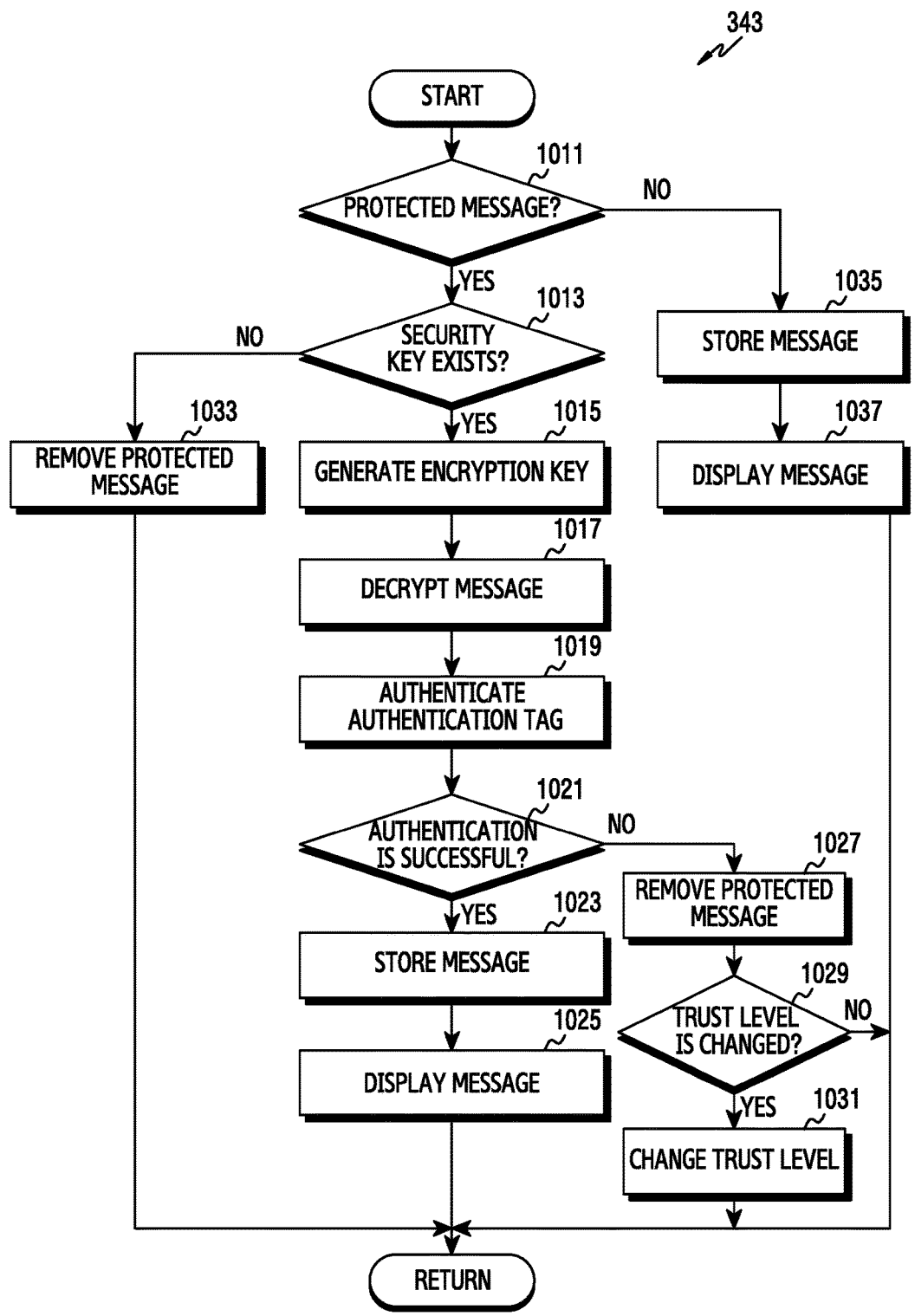
FIG. 10 is a flowchart illustrating a process of performing a message processing operation according to an embodiment of the present disclosure.

FIG. 10 is a flowchart illustrating a process of performing the message processing operation of FIG. 3.

Referring to FIG. 10, the process of performing the message processing operation according to the present embodiment starts from operation 1011 in which the controller 250 determines whether a protected message is received. At this time, the protected message may include the encryption key (KM), the encrypted message (C), and the authentication TAG (ATAG). Meanwhile, a non-protected message may be the message (M).

Next, when it is determined that the protected message is received in operation 1011, the controller 250 detects whether the preset security key $(S_{i-1})$ exists in operation 1013. At this time, the controller 250 may detect whether the preset security key $(S_{i-1})$ exists in accordance with identification data of the external device. If a call session with the external device has been established, the preset security key $(S_{i-1})$ may exist. Meanwhile, if the call session with the external device has not previously been established, the preset security key $(S_{i-1})$ may not exist. The storage unit 240 may store the preset security key $(S_{i-1})$ according to each external device.

When it is determined that the preset security key $(S_{i-1})$ exists in operation 1013, the controller 250 generates the encryption key (KM) in operation 1015. That is, the controller 250 may generate the encryption key (KM) from the preset security key $(S_{i-1})$ and a public key (R) of the protected message. At this time, the controller 250 may input a hash value $(Q(K(i-1)))$ of the preset security key $(S_{i-1})$ and the public key (R) into a preset KDF, and output the encryption key (KM). The controller 250 may further input identification data of the electronic device 200 and identification data of the external device into the KDF. The KDF may be preset to not only the electronic device 200 but also the external device. The controller 250 may calculate the encryption key (KM) as shown in equation (9) below. The identification data of the electronic device 200 may be expressed as "userID1" and the identification data of the external device may be expressed as "userID2". For example, the KDF may be a NIST SP 800-108 algorithm.

$$KM=KDF(Q(K(i-1)),\text{user ID1},\text{user ID2},R) \quad (9)$$

Subsequently, the controller 250 decrypts the encrypted message (C) of the protected message in operation 1017. That is, the controller 250 decrypts the encrypted message (C) by using the encryption key (KM). Accordingly, the controller 250 acquires the message (M).

Continuously, the controller 250 performs an authentication for the message (M) based on the authentication TAG (ATAG) of the protected message in operation 1019. That is, the controller 250 encrypts the message (M) by using the encryption key (KM). Accordingly, the controller 250 generates a temporary encrypted message (C'). That is, the controller 250 generates a temporary authentication TAG (ATAG') based on the encryption key (KM) and the temporary encrypted message (C'). At this time, the controller 250 may input the encryption key (KM) and the message (M) into a preset cryptographic algorithm and output the temporary encrypted message (C') and the temporary authentication TAG (ATAG'). The controller 250 may further input additional authentication information (A) into the cryptographic algorithm. The cryptographic algorithm and the additional authentication information (A) may be preset to not only the electronic device 200 but also the external device. The controller 250 may calculate the temporary encrypted message (C') and the temporary authentication TAG (ATAG') as shown in equation (10) below. Thereafter, the controller 250 determines whether the authentication for the message (M) is successful in operation 1021. At this time, the controller 250 may determine whether the authentication TAG (ATAG) of the protected message and the temporary authentication TAG (ATAG') are the same. For example, when the message (M) is changed between the electronic device 200 and the external device, the authentication TAG (ATAG) and the temporary authentication TAG (ATAG') may be different.

$$\{C',ATAG'\}=AESGCM(KM,M,A) \quad (10)$$

Lastly, when it is determined that the authentication for the message (M) is successful in operation 1021, the controller 250 stores the message (M) in operation 1023. At this time, when it is determined that the authentication TAG (ATAG) of the protected message and the temporary authentication TAG (ATAG') are the same, the controller 250 may determine that the authentication for the message (M) is successful. The controller 250 may store the message (M) in the storage unit 240. The controller 250 displays the message (M) in operation 1025. The controller 250 may display the message (M) through the display unit 230. Thereafter, the controller 250 ends the process of performing the message processing operation according to the present embodiment and returns to FIG. 3.

Meanwhile, when it is determined that the authentication for the message (M) fails in operation 1021, the controller 250 removes the protected message in operation 1027. At this time, when it is determined that the authentication TAG (ATAG) of the protected message and the temporary authentication TAG (ATAG') are different, the controller 250 may determine that the authentication for the message (M) fails. That is, the controller 250 removes the protected message without processing the protected message. Thereafter, the controller 250 determines whether the trust level of the external device can be changed in operation 1029. At this time, the controller 250 may determine whether the trust level of the external device can be changed to a lower level.

When it is determined that the trust level of the external device can be changed in operation 1029, the controller 250 changes the trust level of the external device in operation 1031. At this time, the controller 250 changes the trust level of the external device to the lower level. For example, when the trust level of the external device corresponds to a high level, the controller 250 may change the trust level of the external device to a middle level. Alternatively, when the trust level of the external device corresponds to the middle level, the controller 250 may change the trust level of the external device to a low level.

Meanwhile, when it is determined that the trust level of the external device cannot be changed in operation 1029, the controller 250 ends the process of performing the message processing operation according to the present embodiment and return to FIG. 3. That is, the controller 250 may maintain the trust level without changing the trust level of the external device. For example, when the trust level of the external device corresponds to the low level, the controller 250 may maintain the trust level of the external device as the low level.

When it is determined that the preset security key ($S_{i-1}$) does not exist in operation 1013, the controller 250 removes the protected message in operation 1033. That is, the controller 250 removes the protected message without processing the protected message. Thereafter, the controller 250 ends the process of performing the message processing operation according to the present embodiment and returns to FIG. 3.

Meanwhile, when it is determined that the non-protected message is received rather than the protected message in operation 1011, the controller 250 stores the message (M) in operation 1035. The controller 250 may store the message (M) in the storage unit 240. The controller 250 displays the message (M) in operation 1037. The controller 250 may display the message (M) through the display unit 230. Thereafter, the controller 250 ends the process of performing the message processing operation according to the present embodiment and returns to FIG. 3.

According to the present disclosure, the electronic device 200 may effectively protect the communication with the external device. That is, between the electronic device 200 and the external device, the security key (S) can be protected from external attack. Accordingly, a call session can be protected between the electronic device 200 and the external device. Further, the electronic device 200 may protection-process the message by using the security key (S) and analyze the protection-processed message. Accordingly, between the electronic device 200 and the external device, the message can be protected from external attack. Further, the electronic device 200 may provide a trust level of the external device. That is, the user of the electronic device 200 may grasp the trust level of the external device and determine whether to perform communication with the external device.

Meanwhile, example embodiments of the present disclosure shown and described in this specification and the drawings correspond to specific examples presented in order to easily explain technical contents of the present disclosure, and to help comprehension of the present disclosure, but are not intended to limit the scope of the present disclosure. That is, it is obvious to those skilled in the art to which the present disclosure belongs that different modifications can be achieved based on the technical merits of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. A method of communication in an electronic device, comprising:
    detecting a request for establishing a call session with an external device;

generating a new security key based on a preset security key for the external device;

determining the generated new security key as a current security key for the external device;

establishing the call session based on the current security key; and determining a trust level for the external device based on a number of times that call sessions between the electronic device and the external device are established, wherein determining the trust level comprises:

determining whether the preset security key for the external device exists in a memory;

when the preset security key for the external device exists in the memory; comparing a preset threshold with a count indicating that the number of times that call sessions between the electronic device and the external device are established;

setting the trust level to a first level when the count is greater than the threshold;

setting the trust level to a second level when the count is equal to or smaller than the threshold; and when the preset security key for the external device does not exist in the memory, setting the trust level to a third level, and wherein the second level is lower than the first level, and the third level is lower than the second level.

2. The method of claim 1, wherein generating the new security key further comprises:

transmitting a transmission key to the external device;

receiving a reception key from the external device;

generating a new authentication key based on a shared key and the preset security key, wherein the shared key comprises at least one of the transmission key and the reception key;

performing authentication with the external device utilizing the new authentication key; and generating the new security key based on the preset security key when the authentication with the external device is successful.

3. The method of claim 2, wherein the new authentication key is generated based on the shared key and the preset security key.

4. The method of claim 2, further comprising:

determining whether the preset security key for the external device exists in a memory;

in response to detecting that the preset security key does not exist:

sharing an initial shared key with the external device;

generating an initial authentication key based on the initial shared key;

performing the authentication with the external device based on the initial authentication key; and generating an initial security key based on the initial authentication key and setting the initial security key when the performed authentication with the external device is successful.

5. The method of claim 1, further comprising:

in response to detecting a request for displaying contact information corresponding to the external device, displaying the contact information including identification information of the external device, and information indicating the determined trust level for the external device.

6. The method of claim 1, further comprising:

in response to detecting a request for displaying contact information corresponding to the external device, determining a display method based on the determined trust level; and displaying, based on the display method, the contact information corresponding to the external device, wherein the display method comprises a display color.

7. The method of claim 1, further comprising:

generating a public key;

generating an encryption key from the preset security key and the public key;

encrypting, based on encryption key, a message to be transmitted;

generating an authentication tag using the encryption key and the encrypted message; and transmitting, to the external device, the authentication tag, the encrypted message, and the public key.

8. The method of claim 1, further comprising:

receiving an authentication tag, an encrypted message, and a public key;

generating an encryption key using the preset security key and the received public key;

decrypting the encrypted message using the received encryption key;

authenticating the decrypted message by analyzing the received authentication tag; and displaying the decrypted message when the authentication of the decrypted message is successful.

9. The method of claim 8, wherein the preset security key comprises information associated with a number of times the call sessions between the electronic device and the external device are established.

10. The method of claim 9, further comprising:

in response to detecting a request for displaying contact information corresponding to the external device, determining a trust level based on the information included in the preset security key; and displaying the contact information including identification information of the external device, and the information indicating the trust level.

11. The method of claim 10, further comprising, changing the trust level in response to detecting that failure of authentication of the decrypted message.

12. An electronic device, comprising:

a communication circuitry;

a memory; and at least one processor operatively coupled to the memory, configured to:

detect via the communication circuitry a request for establishing a call session with an external device, generate a new security key based on a preset security key for the external device, determine the generated new security key as a current security key for the external device, establish the call session based on the current security key, and determine a trust level for the external device based on a number of times that call sessions between the electronic device and the external device are established, wherein determining the trust level comprises:

determining whether the preset security key for the external device exists in a memory, when the preset security key for the external device exists in the memory; comparing a preset threshold with a count indicating that the number of times that call sessions between the electronic device and the external device are established, setting the trust level to a first level when the count is greater than the threshold, setting the trust level to a second level when the count is equal to or smaller than the threshold, and when the preset security key for the external device does not exist in the memory, setting the trust level to a third level, wherein the second level is lower than the first level, and the third level is lower than the second level.

13. The electronic device of claim 12, wherein the processor is further configured to:

control the communication circuitry to transmit a transmission key to the external device;

control the communication circuitry to receive a reception key from the external device;

generate a new authentication key based on shared key and the preset security key, wherein the shared key comprises at least one of the transmission key and the reception key;

perform authentication with the external device utilizing the new authentication key; and generate the new security key based on the preset security key when the authentication with the external device is successful.

14. The electronic device of claim 13, wherein the new authentication key is generated based on the shared key and the preset security key.

15. The electronic device of claim 13, wherein the at least one processor is further configured to:

determine whether the preset security key for the external device exists in the memory; and in response to detecting that the preset security key does not exist:

control the communication circuitry to transmit an initial transmission key to the external device, control the communication circuitry to receive an initial reception key from the external device, generate an initial authentication key based on an initial shared key, wherein the initial shared key comprises at least one of the initial transmission key and the initial reception key, performing the authentication with the external device based on the initial authentication key, and generate an initial security key based on the initial authentication key and set the initial security key when the performed authentication with the external device is successful.

16. The electronic device of claim 12, wherein the at least one processor is further configured to:

in response to detecting a request for displaying contact information corresponding to the external device, display the contact information corresponding to the external device and the determined trust level for the external device.

17. The electronic device of claim 12, wherein the preset security key comprises information associated with a number of times the call sessions between the electronic device and the external device are established.

* * * * *